United States Patent
Wen et al.

(10) Patent No.: US 9,282,457 B2
(45) Date of Patent: Mar. 8, 2016

(54) METHOD OF SHARING CREDENTIAL AND WIRELESS COMMUNICATION SYSTEM THEREOF

(71) Applicant: MEDIATEK INC., Hsin-Chu (TW)

(72) Inventors: Yuan-Chin Wen, Taipei (TW);
Shih-Chang Su, Hsinchu County (TW);
Shun-Yong Huang, Hsinchu (TW);
Chih-Shi Yee, Hsinchu County (TW);
Wei-Hung Su, Miaoli County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/148,666

(22) Filed: Jan. 6, 2014

(65) Prior Publication Data

US 2014/0223529 A1    Aug. 7, 2014

Related U.S. Application Data

(60) Provisional application No. 61/760,948, filed on Feb. 5, 2013.

(51) Int. Cl.
*H04W 12/04* (2009.01)
*H04W 12/06* (2009.01)
*H04L 29/06* (2006.01)

(52) U.S. Cl.
CPC .............. *H04W 12/06* (2013.01); *H04W 12/04* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 2008/0070571 A1* | 3/2008 | Nguyen et al. | 455/435.1 |
| 2009/0282251 A1* | 11/2009 | Cook et al. | 713/171 |
| 2011/0044208 A1* | 2/2011 | Yun et al. | 370/254 |
| 2012/0284785 A1* | 11/2012 | Salkintzis et al. | 726/7 |
| 2013/0024921 A1* | 1/2013 | Gupta et al. | 726/6 |
| 2013/0166910 A1* | 6/2013 | Wilkinson et al. | 713/168 |
| 2014/0007209 A1* | 1/2014 | Zucker | 726/7 |
| 2014/0066013 A1* | 3/2014 | Mascarenhas et al. | 455/411 |

* cited by examiner

*Primary Examiner* — Hadi Armouche
*Assistant Examiner* — Malcolm Cribbs
(74) *Attorney, Agent, or Firm* — Winston Hsu; Scott Margo

(57) ABSTRACT

A method of sharing credential in a wireless communication system comprising a first user equipment, a second communication device and a network, includes transmitting a temporal credential and a credential custody request, from the first communication device, to the network; transmitting first custody information, by the network, to the first communication device; transmitting a credential acquiring request and second custody information, by the second communication device, to the network; and determining whether to transmit the temporal credential to the second communication device according to the second custody information.

7 Claims, 8 Drawing Sheets

METHOD OF SHARING CREDENTIAL AND WIRELESS COMMUNICATION SYSTEM THEREOF

CROSS REFERENCE TO RELATED APPLICATIONS

This application claims the benefit of U.S. Provisional Application No. 61/760,948 filed on Feb. 5, 2013 and entitled "Seamless Wi-Fi Subscription Credential Sharing with Credential Custody", the contents of which are incorporated herein.

BACKGROUND

The present disclosure relates to a method and communication system thereof, and more particularly, to a method of sharing credential and communication system thereof.

Nowadays, various kinds of electronic devices, such as smart phones, laptops and tablets, are used in daily life. A user may have multiple electronic devices capable of connecting to the network and require that all of the electronic devices can access the network resources at the same time. However, there may be only one credential (e.g. a SIM UICC of a mobile device) capable of connecting to the network. In such a situation, according to the related art, the user may use one of the electronic devices to connect to the network via the credential, and share the network resources to other electronic devices, such that other electronic devices can access the network resources through the electronic device connecting to the network. In other words, all of the electronic devices share one bandwidth, resulting in declined performance.

SUMMARY

In order to solve the above problem, the present disclosure provides a method of sharing credential in a wireless communication system supporting hotspot 2.0 protocol.

The present disclosure discloses a method of sharing credential in a wireless communication system comprising a first user equipment (UE), a second communication device and a network. The method comprises transmitting a temporal credential and a credential custody request, by the first communication device, to the network; transmitting first custody information, from the network, to the first communication device; transmitting a credential acquiring request and second custody information, by the second communication device, to the network; and determining whether to transmit the temporal credential to the second communication device according to the second custody information.

The present disclosure further discloses a method of sharing credential in a network of a wireless communication system. The method comprises receiving a temporal custody and a credential custody request from a first communication device of the wireless communication system; keeping the temporal credential according to the credential custody request; and transmitting first custody information to the first communication device for informing the first communication device that the temporal credential is under the custody of the network.

The present disclosure further discloses a method of sharing credential in a communication device of a wireless communication system, the method comprising transmitting a temporal credential and a credential custody request to a network of the wireless communication system, for keeping the temporal credential under the custody of the network.

The present disclosure further discloses a method of sharing credential in a communication device of a wireless communication system, comprising transmitting a credential acquiring request and first custody information to a network of the wireless communication system; and acquiring a temporal credential from the network when the first custody information equals second custody information corresponding to the temporal credential.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
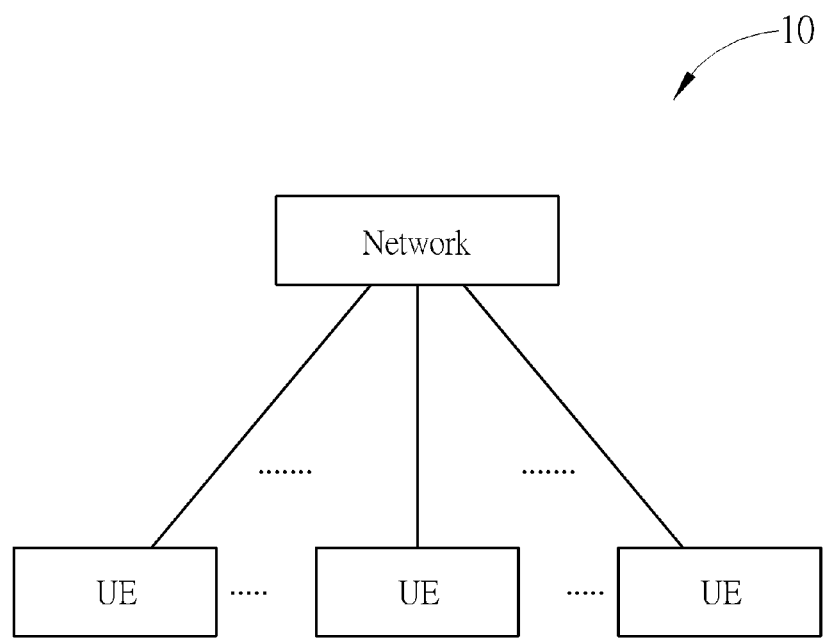
FIG. 1 is a schematic diagram of a wireless communication system according to an example of the present disclosure.

Please refer to FIG. 1, which is a schematic diagram of a wireless communication system 10 according to an example of the present disclosure. The communication system 10 supports a hotspot 2.0 protocol and is briefly composed of a network and a plurality of user equipments (UEs). The network and the UEs are simply utilized for illustrating the structure of the wireless communication system 10. The network may comprise a plurality of servers supporting hotspot 2.0 protocol and plurality of access points (APs). Alternatively, each UE may be a mobile device such as a mobile phone, a laptop, a tablet computer, an electronic book, and a portable computer system. Without loss of generality, the communication device hereafter refers to the UE.

Figure 2:
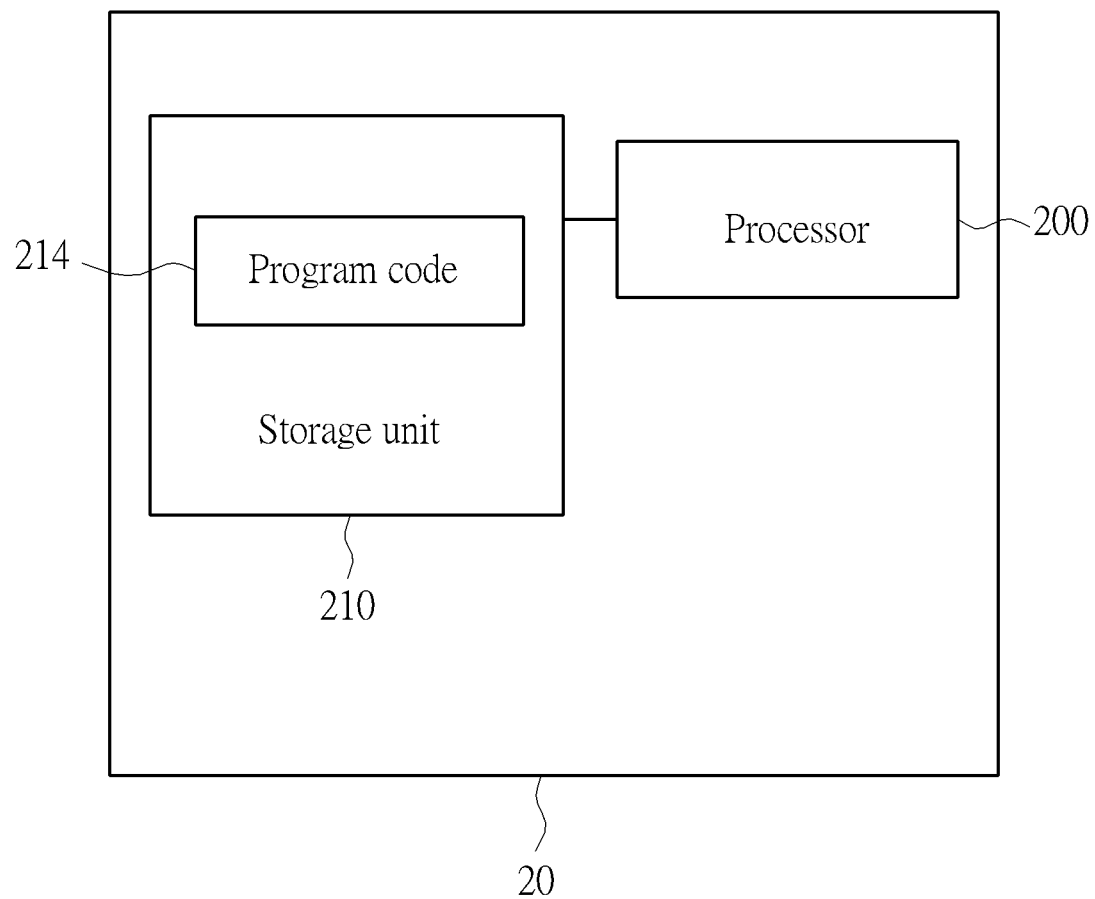
FIG. 2 is a schematic diagram of a communication device according to an example of the present disclosure.

Please refer to FIG. 2, which is a schematic diagram of a communication device 20 according to an example of the present disclosure. The communication device 20 may be the UE shown in FIG. 1, but is not limited herein. The communication device 20 may include a processor 200 such as a microprocessor or Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals with the network according to processing results of the processor 200.

Figure 3:
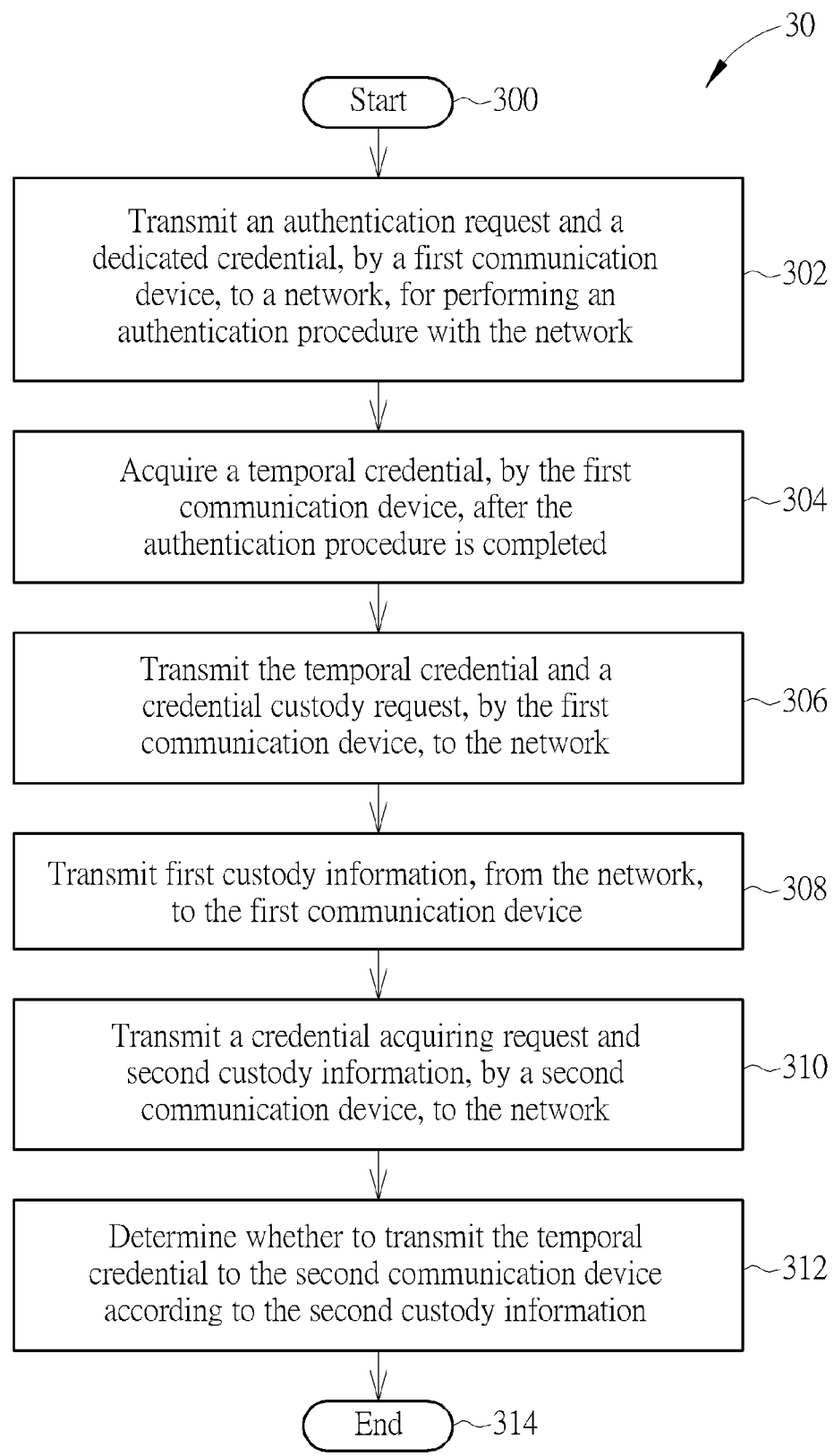
FIG. 3 is a flowchart of a method according to an example of the present disclosure.

Please refer to FIG. 3, which is a flow chart of a process 30 according an example of the present disclosure. The process 30 is utilized in the wireless communication system 10, for sharing the credential between communication devices. The process 30 can be compiled to the program code 214 and comprises the following steps:

Step 300: Start.

Step 302: Transmit an authentication request and a dedicated credential, by a first communication device, to a network, for performing an authentication procedure with the network.

Step 304: Acquire a temporal credential, by the first communication device, after the authentication procedure is completed.

Step 306: Transmit the temporal credential and a credential custody request, by the first communication device, to the network.

Step 308: Transmit first custody information, from the network, to the first communication device.

Step 310: Transmit a credential acquiring request and second custody information, by a second communication device, to the network.

Step 312: Determine whether to transmit the temporal credential to the second communication device according to the second custody information.

Step 314: End.

According to the process 30, the first communication device first sends the authentication request and the dedicated credential to the network, for performing an authentication procedure with the network. The dedicated credential maybe a SIM UICC of a mobile device, and is not limited herein. After the authentication procedure completes, the first communication device acquires the temporal credential from the network. When the first communication device is needed to share the temporal credential with other communication device, the first communication device sends the temporal credential and the credential custody request to the network. After the network receives the temporal credential and the credential custody request from the first communication device, the network returns the first custody information to the first communication device for informing that the temporal credential acquired by the first communication device is under the custody of the network.

Next, if the second communication device is needed to acquire the temporal credential under the custody of the network, the second communication sends the credential acquire request and the second custody information to the network. The network determines whether to send the temporal credential to the second communication device according to the second custody information. If the second custody information equals or matches the first custody information, the network sends the temporal credential of the first communication device to the second communication device and the second communication device can start to access the network resource of the network via the temporal credential acquired by the first communication device. That is, the first communication device shares the temporal credential with the second communication device, such that the first communication device and the second communication device can access the network resources of the network simultaneously.

Figure 4:
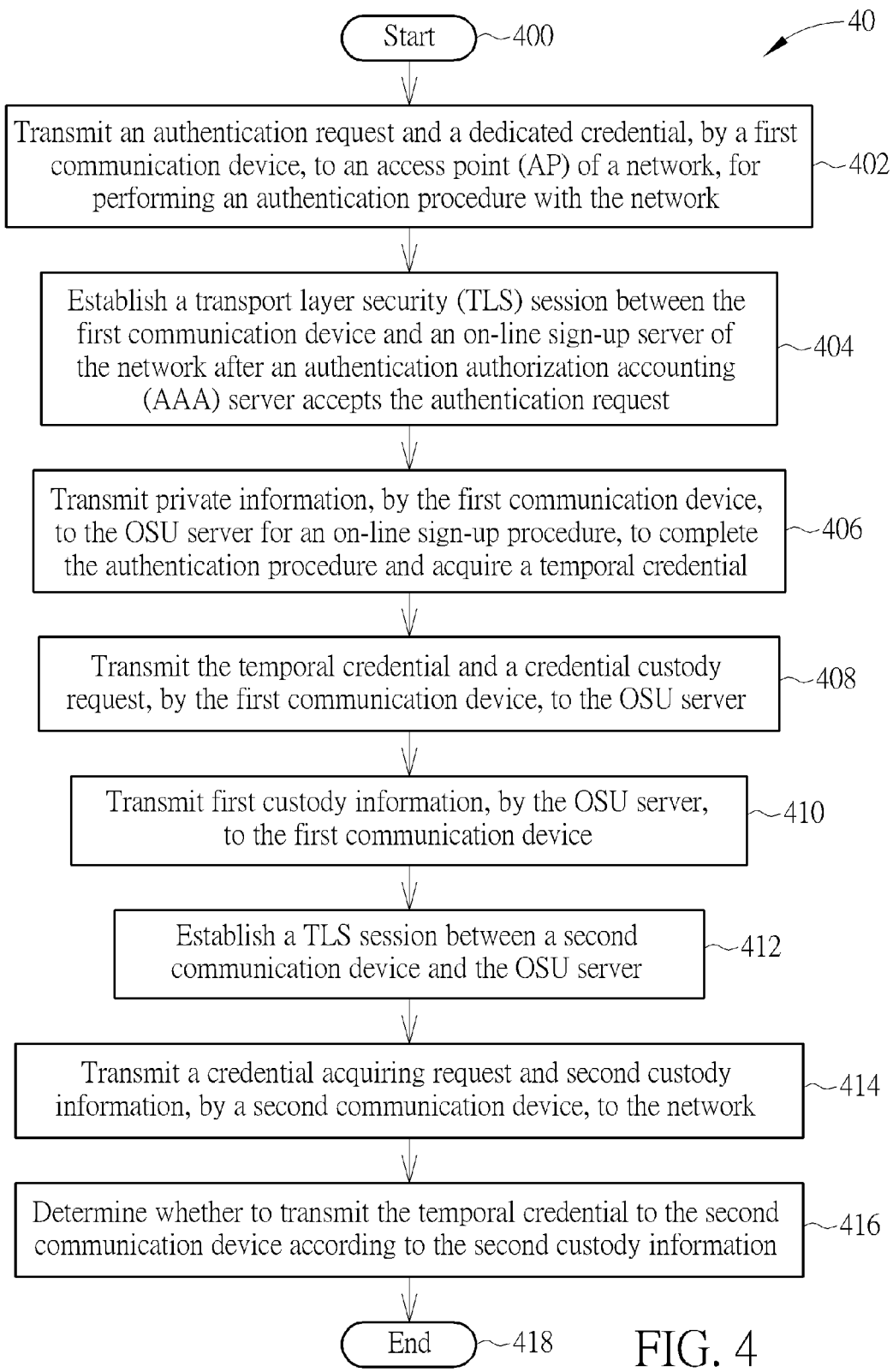
FIG. 4 is a flowchart of a realization method of the method shown in FIG. 3.

Please refer to FIG. 4, which is a flow chart of a process 40 according an example of the present disclosure. The process 40 is a realization method of the process 30, for sharing the credential between communication devices in the communication system 10. The process 40 can be compiled to the program code 214 and comprises the following steps:

Step 400: Start.

Step 402: Transmit an authentication request and a dedicated credential, by a first communication device, to an access point (AP) of a network, for performing an authentication procedure with the network.

Step 404: Establish a transport layer security (TLS) session between the first communication device and an on-line sign-up server of the network after an authentication authorization accounting (AAA) server accepts the authentication request.

Step 406: Transmit private information, by the first communication device, to the OSU server for an on-line sign-up procedure, to complete the authentication procedure and acquire a temporal credential.

Step 408: Transmit the temporal credential and a credential custody request, by the first communication device, to the OSU server.

Step 410: Transmit first custody information, by the OSU server, to the first communication device.

Step 412: Establish a TLS session between a second communication device and the OSU server.

Step 414: Transmit a credential acquiring request and second custody information, by a second communication device, to the network.

Step 416: Determine whether to transmit the temporal credential to the second communication device according to the second custody information.

Step 418: End.

Figure 5:
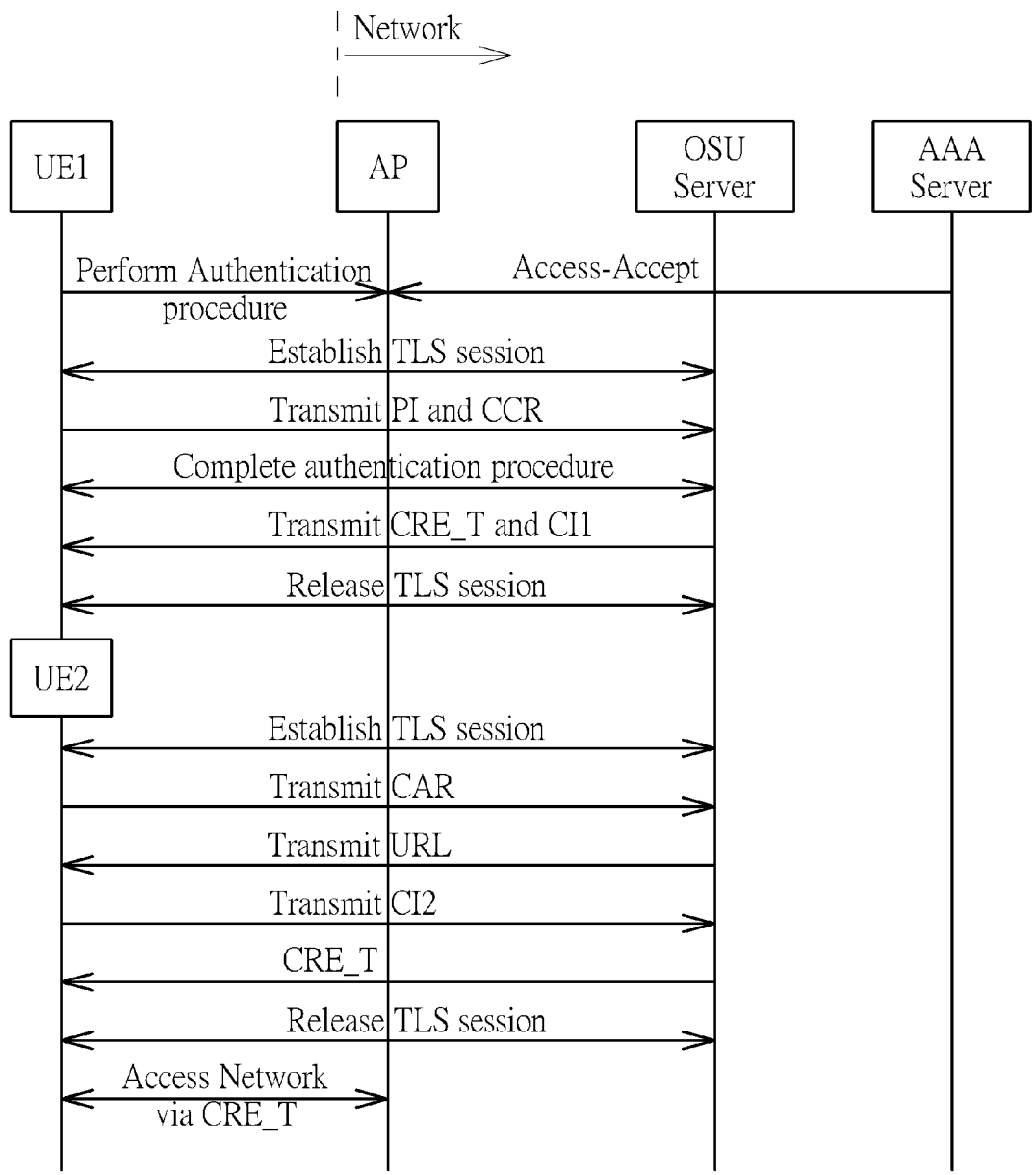
FIG. 5 is a schematic diagram of sharing credential according to an example of the present disclosure.

As to the detail operating procedures of process 40, please refer to FIG. 5. When a user has communication devices UE1 and UE2 and requires that the communication devices UE1 and UE2 can connect to the network simultaneously. The user first manipulates the communication device UE1 (e.g. a mobile phone) to send a dedicated credential CRE_D of the communication device UE1 and an authentication request AR to an access point (AP) of a network for performing an authentication procedure (step 402). The dedicated credential CRE_D may be the SIM UICC of the communication device UE1, and is not limited herein. After an authentication authorization accounting (AAA) server of the network examines the dedicated credential and accepts the authentication request AR, the AAA server sends an accept message to the AP and the communication device UE1 establishes a transport layer security (TLS) session with the on-line sign-up (OSU) server (step 404). The communication device UE1 transmits private information PI and a credential custody request CCR to the OSU server. In this example, the private information PI comprises user name, password and other information of the user, and is not limited herein. The OSU server completes an on-line sign-up procedure of the authentication procedure according to the private information PI, and the authentication procedure completes. Then, the OSU server assigns a temporal credential CRE_T to the communication device UE1. Note that, the OSU server keeps a copy of the temporal credential CRE_T under the custody according to the credential custody request CCR and sends custody information CI1 to the communication device UE1 (steps 406-410). For example, the custody information CI1 may be a custody code (e.g. 12345678). After acquiring the temporal credential CRE_T, the communication device UE1 releases the TLS session and connects to the network via the AP and the temporal credential CRE_T.

Next, since the communication device UE2 does not have the credential for accessing the network resource, the communication device UE2 is limited to connect to the OSU server when the communication device UE2 tries to connect to the network via the AP. The communication device UE2 establishes a TLS session with the OSU server (step 412). In the TLS session, the communication device UE2 transmits a credential acquiring request CAR to the OSU server and the OSU server acquires custody information CI2 from the communication device UE2. In this example, the OSU server acquires the custody information CI2 by allowing the communication device UE2 to launch a web browser to connect to a URL and then the communication device UE2 sends the custody information CI2 to the OSU server via the web browser (step 414). Please note that, the communication device UE2 does not send private information (e.g. user name, password and other information for the authentication procedure). If the OSU server determines that the custody information CI2 equals or matches the custody information CI1 that the OSU server sends to the communication device UE1 (i.e. the user enters the custody information CI1 acquired by the communication device as the custody information CI2), the OSU server sends the temporal credential CRE_T to the communication device UE2 and the communication device UE2 therefore can connect to the network via the AP and the temporal credential CRE_T (step 416). As a result, the communication device UE2 acquires the temporal credential CRE_T without performing the authentication procedure, so as to provide convenient user experience. Moreover, if the user has other devices necessary to connect to the network, the user can carry out the procedures of the communication device UE2 (i.e. steps 412-416) for acquiring the temporal credential CRE_T.

Figure 6:
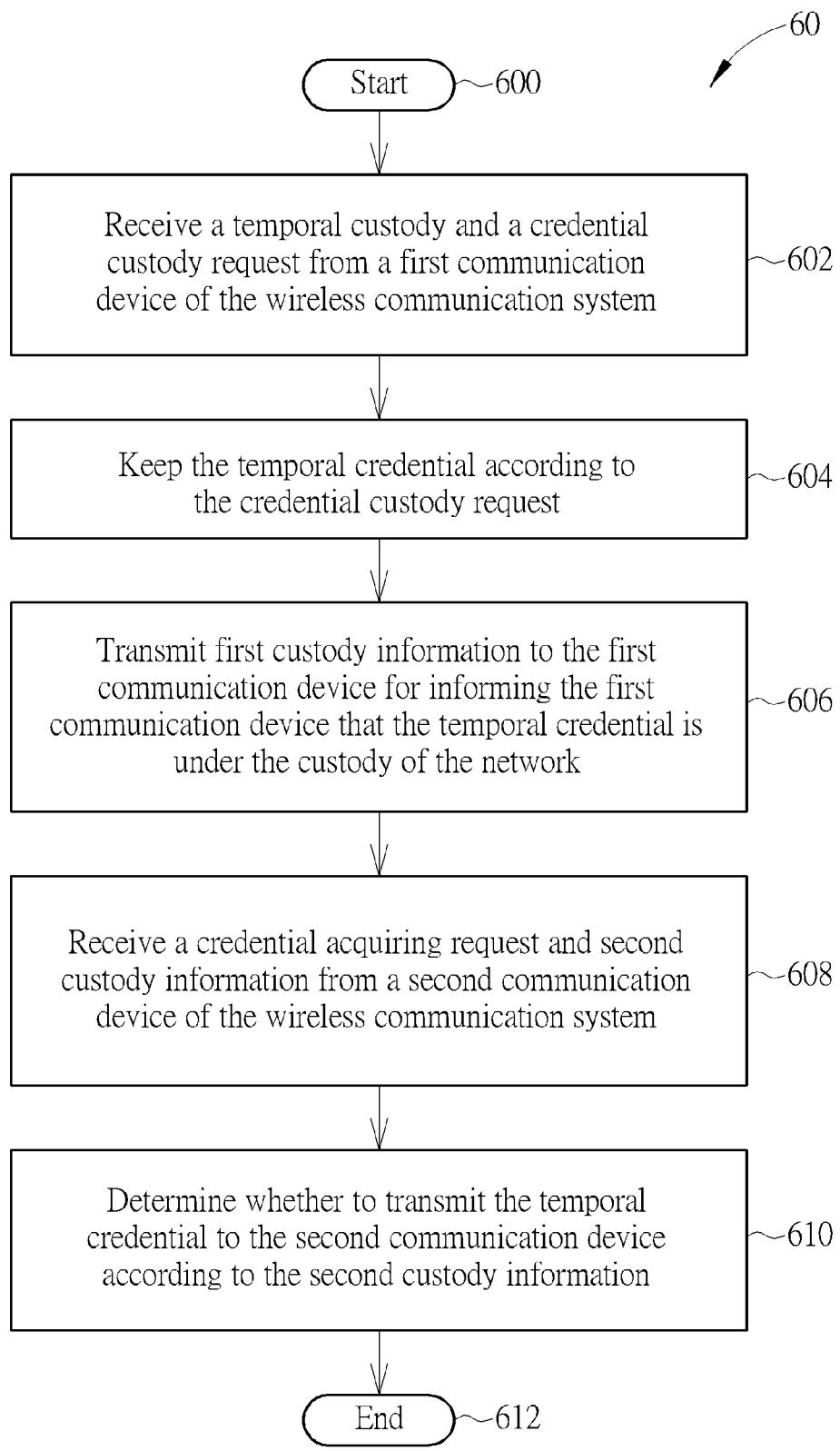
FIGS. 6-8 are flowcharts of methods according to examples of the present disclosure.

According to the above description, operations of the network can be summarized into a process 60 as shown in FIG. 6. The process 60 can be utilized in a network of the wireless communication system 10 and includes the following steps:

Step 600: Start.

Step 602: Receive a temporal custody and a credential custody request from a first communication device of the wireless communication system;

Step 604: Keep the temporal credential according to the credential custody request; and Step 606: Transmit first custody information to the first communication device for informing the first communication device that the temporal credential is under the custody of the network.

Step 608: Receive a credential acquiring request and second custody information from a second communication device of the wireless communication system; and Step 610: Determine whether to transmit the temporal credential to the second communication device according to the second custody information.

Step 612: End.

Detailed operations of the process 60 can be referred to the above, and are not narrated herein for brevity. According to the process 60, the network can keep the temporal credential transmitted from the first communication device under the custody and transmit the temporal credential to the second communication device if the second custody information received from the second communication device equals or matches the first custody information transmitted to the first communication device.

Figure 7:
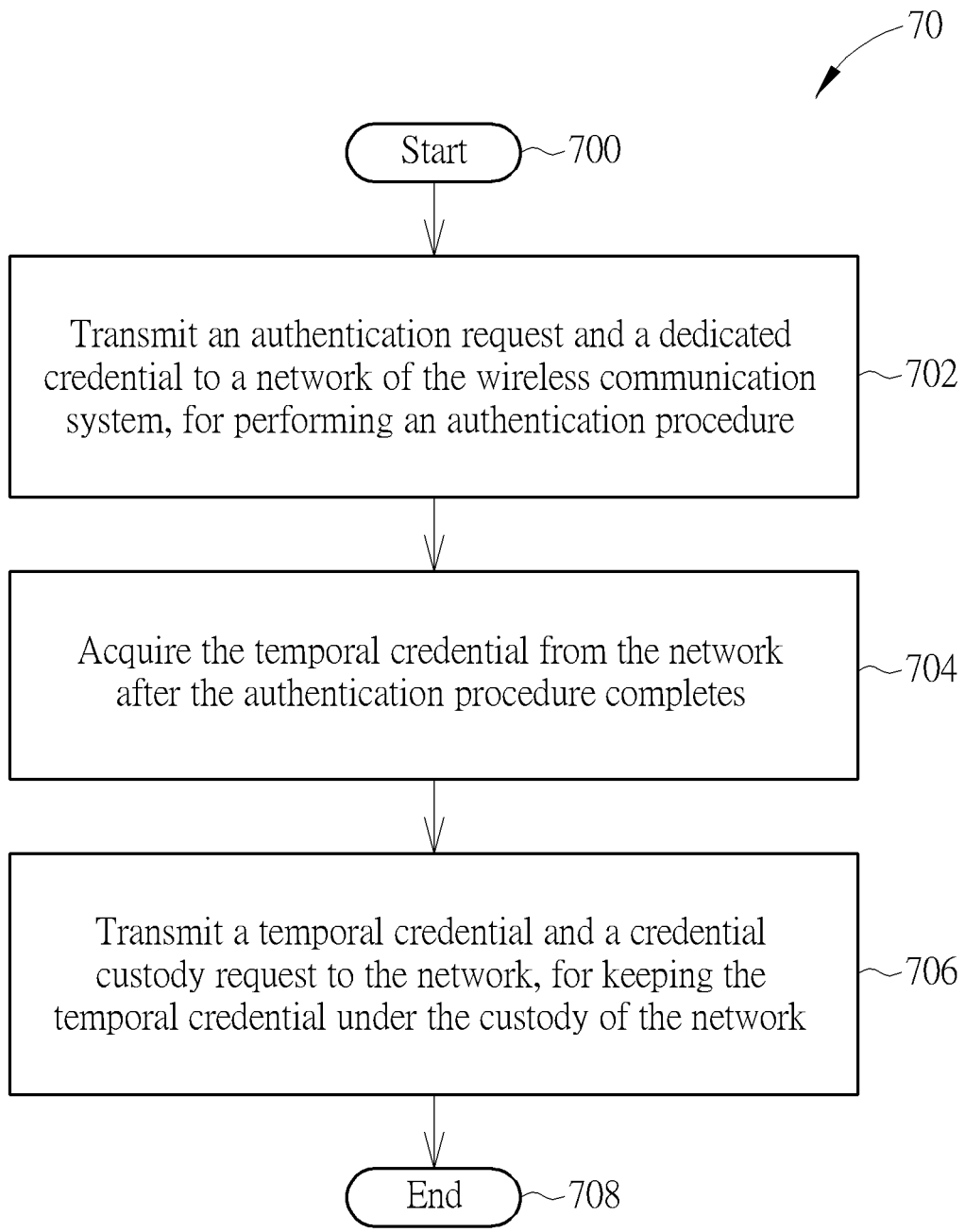

According to the above description, operations of the first communication device can be summarized into a process 70 as shown in FIG. 7. The process 70 can be utilized in a communication device (i.e. UE) of the wireless communication system 10 and includes the following steps:

Step 700: Start.

Step 702: Transmit an authentication request and a dedicated credential to a network of the wireless communication system, for performing an authentication procedure.

Step 704: Acquire the temporal credential from the network after the authentication procedure completes.

Step 706: Transmit a temporal credential and a credential custody request to the network, for keeping the temporal credential under the custody of the network.

Step 708: End.

Detailed operations of the process 70 can be referred to the above, and are not narrated herein for brevity. According to the process 70, the communication device can keep the temporal credential under the custody of the network via transmitting the temporal credential and the credential custody request to the network.

Figure 8:
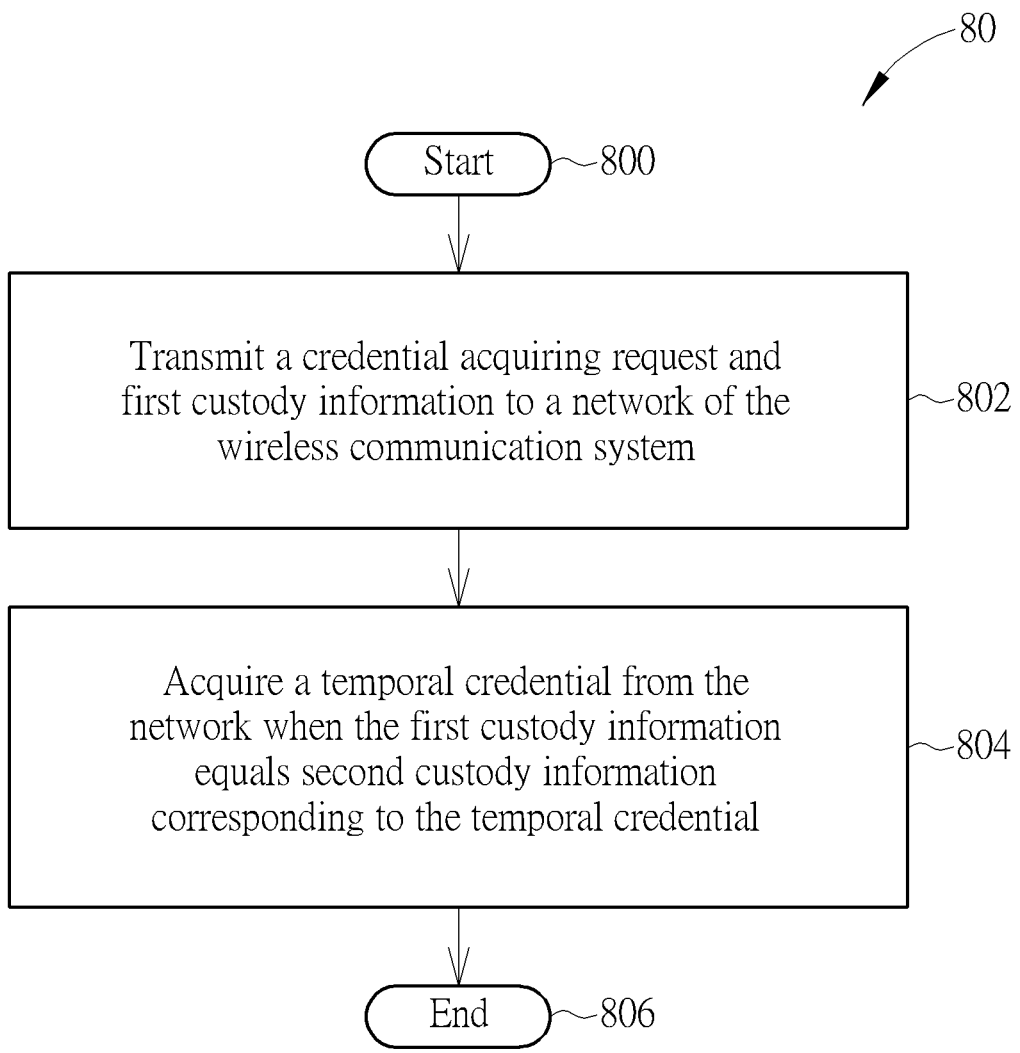

According to the above description, operations of the second communication device can be summarized into a process 80 as shown in FIG. 8. The process 80 can be utilized in a communication device (i.e. UE) of the wireless communication system 10 and includes the following steps:

Step 800: Start.

Step 802: Transmit a credential acquiring request and first custody information to a network of the wireless communication system.

Step 804: Acquire a temporal credential from the network when the first custody information equals second custody information corresponding to the temporal credential.

Step 806: End.

Detailed operations of the process 80 can be referred to the above, and are not narrated herein for brevity. According to the process 80, the communication device can transmit the credential acquiring request and the first custody information to the network for requesting the temporal credential. If the first custody information equals or matches the second custody information corresponding to the temporal credential, the communication device can acquire the temporal credential without performing the authentication procedure and the on-line sign-up procedure.

Noticeably, the above example shares the credential acquired by completing the authentication procedure comprising the on-line sign-up procedure between communication devices in the wireless communication system. The different communication devices in the wireless communication system can access to the network resource, simultaneously, via the same credential. The user does not need to perform the authentication procedure each time of using a communication device to connect to the network, so as to provide a convenient user experience and improve the performance of the wireless communication system. According to different applications and design concepts, those with ordinary skill in the art may observe appropriate alternations and modifications. For example, if the first communication device can use the dedicated credential to access the network resource of the network, then the first communication device can share the dedicated credential with the second communication device instead of sharing the temporal credential acquired from the network. In other words, steps 302 and 304 of the process 30 or the steps 400-406 of the process 40 can be omitted if the dedicated credential of the first communication device can be directly used for accessing the network resource of the network. The first communication device changes to send the dedicated credential and the credential custody request to the network, for putting the dedicated credential under the custody of the network and sharing the dedicated credential with the second communication module.

The example shown in FIG. 5 is to illustrate the flows of the processes 30 and 40, and those skilled in the art should readily make combinations, modifications and/or alterations on the abovementioned description and example. Furthermore, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the above embodiments provide methods for sharing a credential in a wireless communication system supporting hotspot 2.0 protocol. The different communication devices can share the same credential for accessing the network resource without repeating the authentication procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of sharing credential in a wireless communication system comprising a first communication device, a second communication device and a network, the method comprising:
   transmitting an authentication request and a dedicated credential to the network, by the first communication device, for performing an authentication procedure;
   acquiring a temporal credential from the network, by the first communication device, after the authentication procedure completes, wherein the temporal credential is generated by the network;
   transmitting the temporal credential back to the network and transmitting a credential custody request to the network, by the first communication device;
   transmitting first custody information, from the network, to the first communication device;
   transmitting a credential acquiring request and second custody information, by the second communication device, to the network; and
   transmitting the temporal credential to the second communication device, by the network, when the second custody information equals the first custody information.

2. The method of claim 1, wherein the step of acquiring the temporal credential, by the first communication device, after the authentication procedure completes comprises:
   establishing a session between the first communication device and the network;
   transmitting private information, by the first communication device, to the network for completing an on-line sign-up procedure of the authentication procedure; and
   acquiring the temporal credential, by the first communication device.

3. A method of sharing credential in a network of a wireless communication system, the method comprising:
   receiving an authentication request and a dedicated credential from a first communication device of the wireless communication system, for performing an authentication procedure;
   generating a temporal credential and transmitting the temporal credential to the first communication device after the authentication procedure completes;
   receiving the temporal credential and a credential custody request from the first communication device;
   keeping the temporal credential according to the credential custody request;
   transmitting first custody information to the first communication device for informing the first communication device that the temporal credential is under the custody of the network;
   receiving a credential acquiring request and second custody information from a second communication device of the wireless communication system; and
   transmitting the temporal credential to the second communication device when the second custody information equals the first custody information.

4. A method of sharing credential in a communication device of a wireless communication system, the method comprising:
   transmitting an authentication request and a dedicated credential to a network of the wireless communication system, for performing an authentication procedure;
   acquiring a temporal credential from the network after the authentication procedure completes, wherein the temporal credential is generated by the network;
   transmitting the temporal credential back to the network and transmitting a credential custody request to the network, for keeping the temporal credential under the custody of the network, wherein the network receives a credential acquiring request and second custody information from a second communication device of the wireless communication system; and
   transmitting the temporal credential to the second communication device when the second custody information equals the first custody information.

5. The method of claim 4, wherein the step of acquiring the temporal credential after the authentication procedure completes comprises:
   establishing a session between the first communication device and the network;
   transmitting private information to the network for completing an on-line sign-up procedure of the authentication procedure; and
   receiving the temporal credential.

6. A wireless communication system comprising:
   a first communication device;
   a second communication device; and
   a network;
   wherein the first communication device transmits an authentication request and a dedicated credential to the network for performing an authentication procedure; the first communication device acquires a temporal credential from the network after the authentication procedure completes, wherein the temporal credential is generated by the network; the first communication device transmits the temporal credential back to the network and transmits a credential custody request to the network;
   wherein the network transmits first custody information to the first communication device;
   wherein the second communication device transmits a credential acquiring request and second custody information to the network; and
   wherein the network transmits the temporal credential to the second communication device when the second custody information equals the first custody information.

7. A non-transitory computer readable medium including instructions that when executed by a processor perform the following steps:
   transmitting an authentication request and a dedicated credential to the network, by the first communication device, for performing an authentication procedure;
   acquiring a temporal credential from the network, by the first communication device, after the authentication procedure completes, wherein the temporal credential is generated by the network;
   transmitting the temporal credential back to the network and transmitting a credential custody request to the network, by the first communication device;
   transmitting first custody information, from the network, to the first communication device;

transmitting a credential acquiring request and second custody information, by the second communication device, to the network; and transmitting the temporal credential to the second communication device, by the network, when the second custody information equals the first custody information.

* * * * *